March 7, 1950 G. GERARD 2,500,068
INSTRUMENT FOR TESTING COMPRESSION
Filed Aug. 1, 1945

INVENTOR.
George Gerard.
BY Charles S. Wilson
ATTORNEY.

Patented Mar. 7, 1950

2,500,068

UNITED STATES PATENT OFFICE 2,500,068

INSTRUMENT FOR TESTING COMPRESSION

George Gerard, New York, N. Y., assignor to Republic Aviation Corporation, Farmingdale, N. Y., a corporation of Delaware Application August 1, 1945, Serial No. 608,227

8 Claims. (Cl. 73—94)

This invention relates to machines or instruments for testing the compression of materials and proposes the modification and combination of a standard compression jig with a standard extensometer to automatically produce a composite curve or graph showing the ratio of load to compression of materials being tested in a testing machine or assembly.

Among its other objects the present invention contemplates the elimination of the use of individual compression gages or extensometers, the adjustment thereof, the taking and coordination of a multiplicity of individual readings and the calculations incidental to the plotting of graphs or curves from the many readings heretofore involved in the testing of materials for compression.

The combined compression jig and extensometer forming the subject matter hereof is primarily designed for use in conjunction with a testing machine or assembly disclosed in the co-pending application Ser. No. 607,996, filed July 31, 1945, covering a deflectometer and by express reference made a part hereof.

With the above and other objects in view, as will be apparent, the above invention consists in the construction, combination and arrangement of parts all as hereinafter more fully described, claimed and illustrated in the accompanying drawings, wherein:

Figure 1:
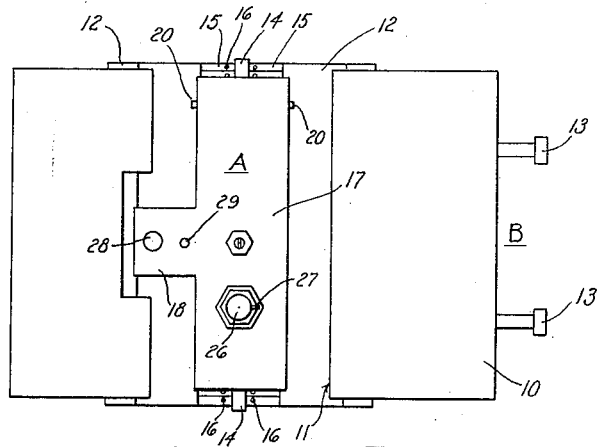
Fig. 1 is a front elevation of a standard compression jig combined with a standard extensometer according to the teachings of the present invention.
Figure 2:
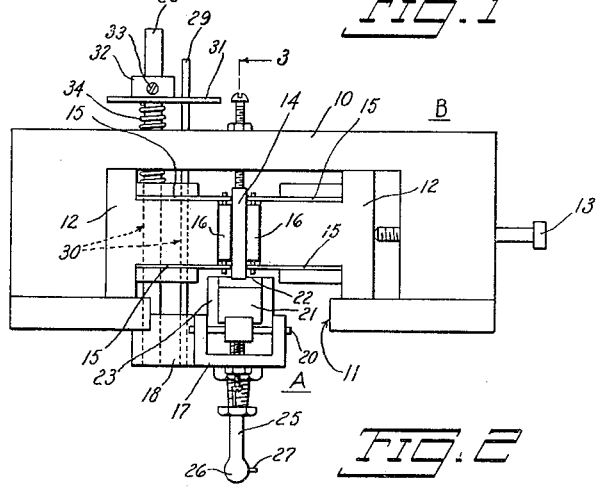
Fig. 2 is a plan view thereof.
Figure 3:
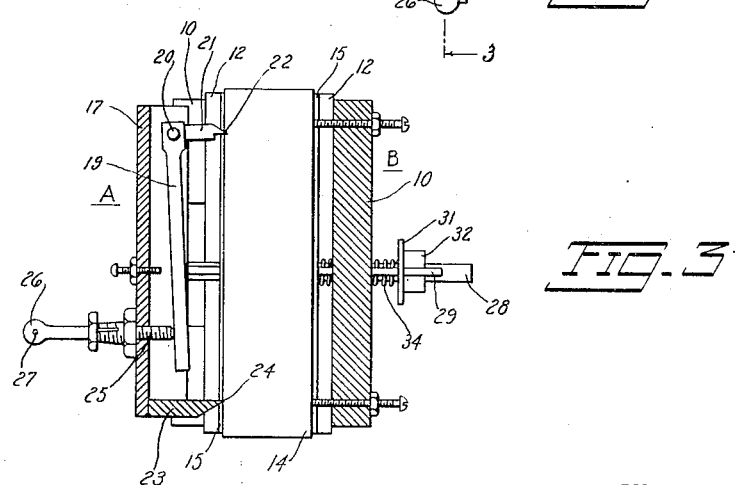
Fig. 3 is a vertical section taken along line 3—3 of Fig. 2.

Compression jigs substantially like that disclosed in the accompanying drawing have been known and commonly used prior to this invention for the purpose of testing the compression of metals and other materials. This jig has been used heretofore in conjunction with individual gages attached to the material being tested and requiring individual adjustments and readings before and during the test. In testing materials for compression by the use of equipment available prior to this invention it has been necessary to employ at least two operators, one for the operation of the testing machine or assembly and the taking of readings from the load indicator and the other for the adjustment of the gages and taking of readings therefrom. After the readings have been taken from both the compression gages and the load indicator the calculations and coordination must be made before a curve can be plotted to show graphically the ratio of load to compression. These previous methods using the jig herein shown have been unsatisfactory because of the possibility of error, the calculations and adjustments which have to be constantly made during the test and the final coordination of the multiple readings in order to plot the curve to show ratio of load to deflection.

The extensometer which is combined with the compression jig to produce the present instrument has been only used heretofore in the testing of materials in tension and has never, so far as is known, been used in the testing of materials for compression.

The present invention making no claim to either the jig per se or to the extensometer per se proposes the combination of these two known and standard elements to produce a new and useful result, viz: the automatic plotting of a graph or curve showing the ratio of load to compression from the operation of the combined device, using only one operator for the entire test and without any individual and independent readings, calculations, adjustments or coordination of readings.

Reference being had more particularly to the drawings, B indicates a standard compression jig comprising a frame 10, open as at 11 upon one side, and housing a pair of relatively movable jaws 12. These jaws are adjustable by the bolt or bolts 13 to and from one another to engage a section 14 of the material to be tested therebetween. For the mounting of the material a plate 15 is mounted upon and secured to each face of each jaw 12 to project beyond the working face thereof. The projecting portions of the plates 15 of each jaw carry between them a series of vertically aligned rollers 16 whereby the adjacent faces of the jaws 12 are substantially covered by a series of superposed rollers. The section 14 of the material to be tested is positioned between these series of rollers and is therefore free to move so far as the jaws 12 are concerned, but is prevented by the jaws from buckling or becoming deformed otherwise than by compression. The jig thus generally described is positioned on the bed of a testing instrument or assembly such as described and shown in the aforesaid copending application with one end of the material 14 contacting the movable head of the testing unit while the other end abuts the fixed bed thereof. The movement of the head toward the bed or base of the unit causes a compression of the material 14 between these components or elements of the testing unit.

The extensometer A used in conjunction with the jig B comprises a generally U-shaped frame 17 carrying a fixed lateral supporting extension 18. A lever 19 is pivoted, as at 20, between the upper opposed sides of the U-frame 17 and adjoining its pivot 20 is provided with a rectangularly disposed extension 21 which terminates in a movable knife-edge 22. Below the lower extremity of the lever 19 and extending laterally in a plane normal to the surface of the material 14 to be tested is a bar 23, fixed to the U-frame 17 and extending beyond the limits of the sides thereof to terminate in a fixed knife-edge 24. A control bolt 25 is threaded through the base of the U-frame 17 to contact at its inner end with the free extremity of the lever 19 and at its outer end is provided with an enlargement 26 having a laterally projecting stud 27. This enlarged extremity 26 of the bolt 25 is seated in the extremity of a hollow drive shaft which in turn is connected to a synchronous or Selsyn motor designed to rotate the thread of the bolt 25 in a reverse direction to move the inner terminal of the bolt out of contact with the free extremity of the lever 19.

For the purpose of combining the jig B and the extensometer A one of the jaws 12 of the former is provided with a pair of parallel openings 30 extending completely through the jaw, for the reception and passage of a pair of parallel rods 28 and 29 fixed to the lateral supporting extension 18 of the frame 17. On that side of the jig B opposed to the extensometer A the rod 28 carries a transverse plate 31 by means of a bearing or collar 32 fixed to the plate. This plate 31 is provided with an aperture for the free passage of the rod 29 and a set screw 33 pierces the collar 32 of the plate 31 to impinge on the rod 28 and to fix the position of the plate 31 thereon. Manifestly the position of the plate 31 on the rod 28 may be adjusted. A coil spring 34 encircles the rod 28 between the plate 31 and the jaw 12 of the jig through which the rods 28 and 29 pass and its action is to draw the extensometer A as a unit inwardly of the jig B to bring the movable knife edge 22 and the fixed knife edge 24 into intimate and biting contact with the edge of the material 14.

In this manner the movable knife-edge 22 is in biting contact with the edge of the material 14 while the fixed knife-edge 24 is in similar contact with the same edge of the material 14 in spaced parallel relation to the movable knife-edge 22. Upon the movement of the head of the testing unit relative to the bed or base, the material 14 is compressed and the distance between the knife-edges 22 and 24 is reduced. This tends to cause, or causes, the lever 19 to swing about its pivot 20 toward the base of the U-frame 17 of the extensometer A. This movement or tendency to move the lever 19 causes its free end to contact with the inner extremity of the bolt 25 which in the absence of provision for the reverse threading of the bolt might arrest the movement of the lever 19. However the lever 19 and the bolt 25 are in a circuit which controls the operation of the Selsyn motor connected to the enlarged extremity 26 of the bolt 25, so that when the lever 19 contacts the bolt 25 the operation of this Selsyn motor is initiated and the bolt is threaded outwardly of the base of the frame 17 until its engagement with the free end of the lever 19 is broken whereupon the operation of the motor is halted. When the operation of the motor connected to the outer end of the bolt 25 is halted the bolt remains stationary while the metal 14 is further compressed thereby again moving the lever 19 about its pivot under the influence of such compression bringing its free end again into contact with the inner extremity of the bolt 25 thereby reinitiating the operation of said motor. This operation is repeated and continuous until the completion of the test.

By using the present combination of jig and extensometer in conjunction with the testing machine or assembly shown in the aforesaid application and also in conjunction with the control and operating circuits therein disclosed the making and breaking of the contact between the lever 19 and the bolt 25 as above described results in an intermittent operation of the recorder and the plotting of a curve showing the ratio of compression to load without making any individual readings or requiring a combining of readings or calculations for the purpose of plotting the desired curve. The entire plotting of the load to compression curve is graphically recorded, automatically.

It is repeated that the present invention resides in the combination of a known compression jig with a known extensometer and the means by which the combination is accomplished. Since the specific construction of neither the jig B nor that of the extensometer A forms any part of the present invention the type and details of construction thereof may be varied and changed without departing from the spirit and scope hereof. Likewise the independent use of any type or construction of jig or extensometer cannot be said to come within the spirit and scope of this invention.

What is claimed is:

1. The combination with a compression jig having a pair of relatively movable jaws to engage a section of material to be tested and hold it with one face exposed, one of said jaws having a pair of parallel passages extending through it, of an extensometer comprising a U-frame, a lever pivoted between the sides of said frame at one end and having a lateral arm projecting outwardly of said sides, and a fixed bar between the frame sides at the opposite end of the frame, a laterally disposed supporting extension fixed to the frame and positioned over the jaw with the passages aforesaid, a pair of rods fixed to said extension and extending through said passages to project beyond the face of the jaw opposed to that co-acting with said extension, a transverse plate attached to one of said rods, and a coil spring encircling said rod between the plate and the jaw to draw the frame toward the jaw and the extremities of the arm and fixed bar into operative engagement with the exposed face of the material to be tested.

2. The combination with a compression jig having a pair of relatively movable jaws to engage a section of material to be tested and hold it with one face exposed, one of said jaws having a pair of parallel passages extending completely through it, of an extensometer comprising a frame, U-shaped in section, a lever pivoted between the sides and adjacent one end of the frame, a lateral arm projecting from the lever terminating in a movable knife-edge beyond the sides of the frame, and a fixed bar between the sides and at the opposite end of the frame terminating in a fixed knife-edge beyond the sides of the frame, a supporting extension on one side of the frame to be positioned over that jaw of the jig having the passages, a pair of parallel rods fixed to said extension and mounted for reciprocation in the aforesaid passages, a plate adjustably mounted on the projecting portions of said rods, and a spring operating between said plate and the jaw to draw the extensometer toward the jig and bring both of said knife-edges into operative engagement with the exposed face of the material being tested.

3. The combination with a jig having a plurality of jaws to hold a section of material to be tested with one face exposed, of an extensometer having projecting contact members, a lateral support carried by the extensometer to overlie one of said jaws, and means for removably and yieldably securing said support to the underlying jaw whereby the extensometer rests over the exposed face of the material with its contact members drawn into operative engagement therewith.

4. In a compression testing machine, the combination with a jig having a fixed and a movable jaw to clampingly engage the material to be tested, of an extensometer removably secured to said fixed jaw comprising a frame, a lever pivoted on said frame having an arm extending outwardly therefrom, and a fixed arm on said frame spaced from and extending in the same general direction as said outwardly extending arm, and means to draw the outer extremities of said arms into engagement with a surface of the material to be tested.

5. The combination with a jig having relatively movable members to clampingly engage material to be tested, of an extensometer resiliently mounted on said jig comprising a fixed and a pivoted arm in approximately spaced parallel arrangement to be drawn into engagement with a surface of the material being tested by the resilient mounting aforesaid, a threaded screw to contact and arrest the movement of the pivoted arm, and means operative upon contact between the screw and the pivoted member to move the screw away from said pivoted arm.

6. The combination with a compression jig having a fixed and a movable jaw to clampingly engage material to be tested, of an extensometer mounted on said fixed jaw comprising a frame, a lever pivoted on said frame having an arm movable with and projecting outwardly therefrom, a stationary arm attached to said frame in spaced and generally parallel relationship to said movable arm, a laterally supporting bracket fixed to said frame, resilient mounting means cooperative with said bracket to draw the frame toward the fixed jaw aforesaid and forcibly engage the extremities of said arms with a surface of the material being tested, a stop threaded in said frame to contact and arrest the movement of the lever, and means under control of the contact to rotate and thereby move the stop away from said lever.

7. The combination with a jig having a pair of parallel, relatively movable jaws adapted to clampingly engage a workpiece throughout the major portion of its length between them and hold it with one edge exposed, of an extensometer mounted on and carried by one of said jaws to overlie the exposed edge of the workpiece, consisting of a fixed contact member and a pivoted contact member, and yielding means associated with the extensometer and the coacting jaw of the jig to hold said contact members in operative engagement with the exposed edge of the workpiece.

8. The combination with a jig having a pair of parallel, relatively movable jaws adapted to clampingly engage a workpiece throughout the major portion of its length between them and hold it with one edge exposed, of an extensometer comprising a fixed contact and a superposed movable contact, means for mounting said extensometer on one of said jaws for movement relative thereto, and means in association with said mounting means tending to move the extensometer constantly in the direction of the jaw carrying said extensometer thereby establishing operative engagement between the contacts aforesaid and the exposed edge of the workpiece.

GEORGE GERARD.

REFERENCES CITED

The following references are of record in the file of this patent:

UNITED STATES PATENTS

| Number | Name | Date |
| --- | --- | --- |
| 575,651 | Kidwell | Jan. 19, 1897 |
| 1,279,340 | Hayes et al. | Sept. 17, 1918 |
| 2,091,535 | Templin et al. | Aug. 31, 1937 |
| 2,350,060 | Montgomery | May 30, 1944 |
| 2,368,900 | Templin | Feb. 6, 1945 |